(12) United States Patent
Mohamed et al.

(10) Patent No.: US 10,745,021 B2
(45) Date of Patent: Aug. 18, 2020

(54) METHODS AND APPARATUS TO ESTIMATE A SUSPENSION DISPLACEMENT

(71) Applicant: Ford Global Technologies, LLC, Dearborn, MI (US)

(72) Inventors: Ahmed Mohamed, Dearborn, MI (US); Joseph M. Raad, Farmington, MI (US); Russ Lee Norton, Brownstown Township, MI (US); Jorge Rivas, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 62 days.

(21) Appl. No.: 16/016,227

(22) Filed: Jun. 22, 2018

(65) Prior Publication Data
US 2019/0389476 A1 Dec. 26, 2019

(51) Int. Cl.
*B60W 50/00* (2006.01)
*B60G 17/018* (2006.01)
*B60W 40/10* (2012.01)
*B60W 30/182* (2020.01)

(52) U.S. Cl.
CPC ..... *B60W 50/0098* (2013.01); *B60G 17/0182* (2013.01); *B60W 30/182* (2013.01); *B60W 40/10* (2013.01); *B60W 2050/0026* (2013.01); *B60W 2050/0055* (2013.01); *B60W 2050/0056* (2013.01); *B60W 2510/22* (2013.01); *B60W 2520/10* (2013.01); *B60W 2540/18* (2013.01); *B60W 2710/22* (2013.01)

(58) Field of Classification Search
CPC ............. B60W 50/0098; B60W 40/10; B60W 30/182; B60W 2510/22; B60W 2540/18; B60W 2050/0055; B60W 2520/10; B60W 2050/0026; B60W 2710/22; B60W 2050/0056; B60G 17/0182
USPC ........................................................... 701/37
See application file for complete search history.

(56) References Cited

U.S. PATENT DOCUMENTS

| | | | |
|---|---|---|---|
| 9,221,469 B2 | 12/2015 | Yoshimi et al. | |
| 9,452,657 B1 | 9/2016 | Giaier et al. | |
| 9,835,451 B2 | 12/2017 | Illg et al. | |
| 2008/0021611 A1 | 1/2008 | Hiebert et al. | |
| 2009/0254249 A1* | 10/2009 | Ghoneim | B60G 17/0152 701/38 |
| 2015/0046033 A1* | 2/2015 | Yoshimi | B60G 17/015 701/37 |
| 2017/0297402 A1 | 10/2017 | Chen et al. | |

FOREIGN PATENT DOCUMENTS

| JP | 09030230 A | * 2/1997 |
|---|---|---|
| JP | H08175146 | 4/2001 |

* cited by examiner

*Primary Examiner* — Maceeh Anwari
(74) *Attorney, Agent, or Firm* — Ray Coppiellie; Hanley, Flight & Zimmerman, LLC

(57) ABSTRACT

Methods, apparatus, systems and articles of manufacture are disclosed for estimating a suspension displacement. An example apparatus includes a suspension motion determiner module programmed to output a signal to a first suspension assembly of a vehicle based on a first deflection of the first suspension assembly, the first deflection calculated based on a calculation and a second deflection of a second suspension assembly of the vehicle, the calculation selected based on whether the vehicle is utilized in a first mode or a second mode.

17 Claims, 8 Drawing Sheets

US 10,745,021 B2

METHODS AND APPARATUS TO ESTIMATE A SUSPENSION DISPLACEMENT

FIELD OF THE DISCLOSURE

This disclosure relates generally to vehicles, and, more particularly, to estimation of a suspension displacement.

BACKGROUND

In recent years, consumer vehicles have implemented various combinations of active and/or semi-active suspension systems. Such active and semi-active suspension systems allow for greater control of a position of the associated suspension systems, leading to a smoother ride for occupants of a vehicle that implements active suspension systems in addition to improved handling characteristics of the vehicle. In order to enable control of the position of active and semi-active suspension systems, it is required to know the position (e.g., a deflection) of the respective suspension system. Typically, a sensor capable of measuring deflection of the suspension system (e.g., a ride height sensor, a linear encoder, a potentiometer, etc.) is used.

Figure 1A:
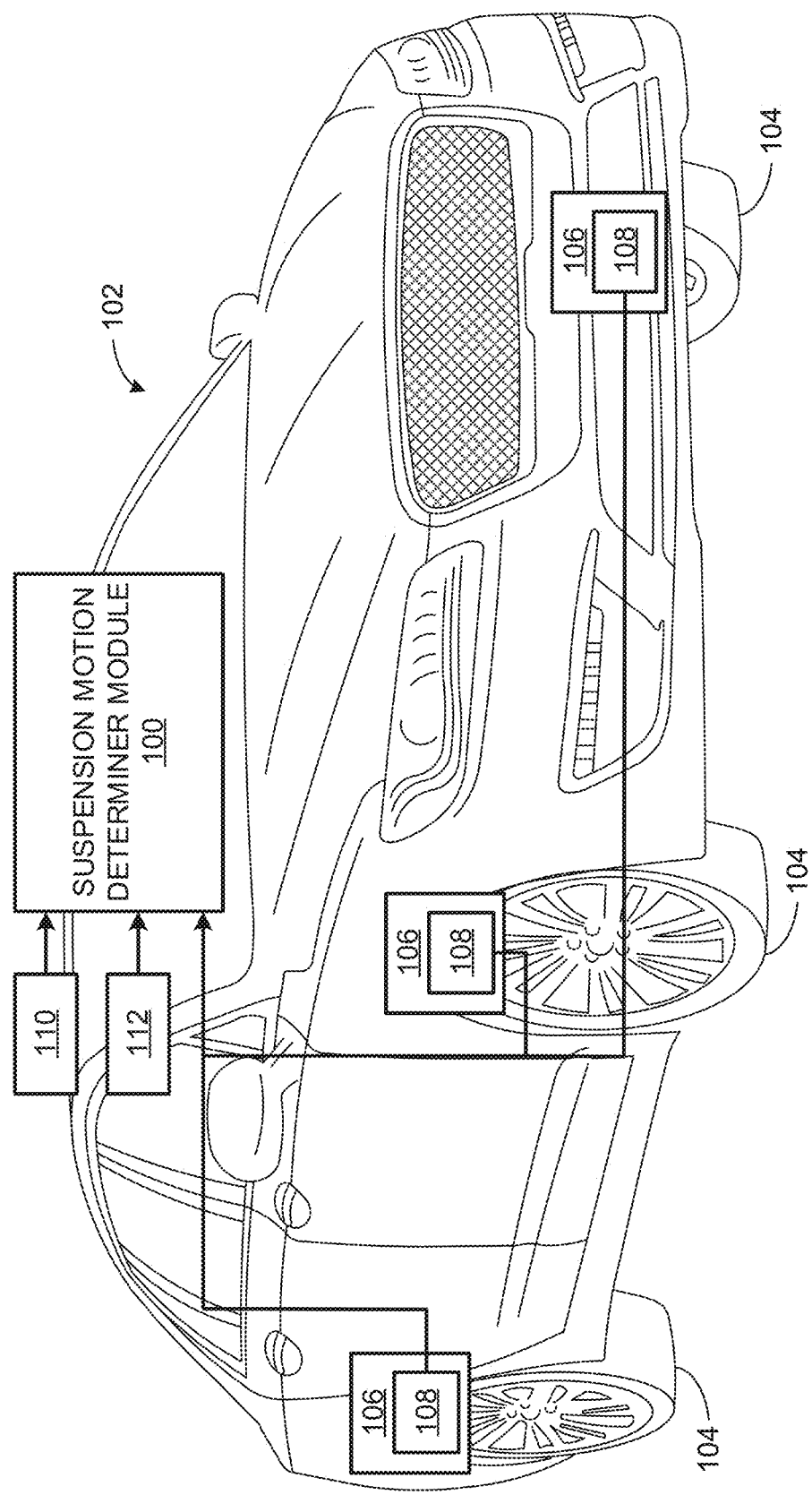
FIGS. 1A and 1B illustrate an example vehicle including a suspension motion determiner module by which the examples disclosed herein can be implemented.

The figures are not to scale. In general, the same reference numbers will be used throughout the drawing(s) and accompanying written description to refer to the same or like parts. Although the figures show layers and regions with clean lines and boundaries, some or all of these lines and/or boundaries may be idealized. In reality, the boundaries and/or lines may be unobservable, blended, and/or irregular.

DETAILED DESCRIPTION

Consumer vehicles have recently begun to implement various combinations of active and/or semi-active suspension systems. Such active and semi-active suspension systems allow for greater control of a position of the associated suspension systems, leading to a smoother ride for occupants of a vehicle that implements one or more active suspension systems. Additionally, in some examples, the implementation of active suspension systems can lead to improved handling characteristics of the vehicle. In order to enable control of the position of active and semi-active suspension systems, it is required to know the position (e.g., a deflection) of the suspension system. Typically, a sensor capable of measuring deflection of the suspension system (e.g., a ride height sensor, a linear encoder, a potentiometer, etc.) is utilized.

However, adding a sensor capable of measuring deflection of each suspension system included in a vehicle (e.g., four sensors on a vehicle with four wheels, eight sensors on a vehicle with eight wheels, etc.) can have a significant cost associated with the addition. Additionally, each addition of a sensor or other component to the vehicle increases a quantity of potential failure points of the vehicle. As such, reducing a component quantity of the vehicle will result in a corresponding increase in reliability of the vehicle.

Examples disclosed herein calculate a deflection of a suspension assembly that does not include a displacement sensor (e.g., ride height sensor, a potentiometer, a linear encoder, etc.) based on known deflections of other suspension assemblies included in the vehicle (e.g., the deflections known based on ride height sensor data, etc.). More specifically, the examples determine an equation (e.g., a calculation) to utilize to calculate the deflection of the suspension assembly that does not include the displacement sensor based upon determining whether the vehicle is utilized in a first mode (e.g., approximately straight line driving) or the vehicle is utilized in a second mode (e.g., a roll event, turning, etc.). In some examples, the use of a first equation and a second equation, as described above, is to compensate for the roll event, which includes roll of the vehicle about a longitudinal axis (e.g., direction of travel) of the vehicle when the vehicle is, for example, turning.

As will be set forth in greater detail below, the examples disclosed herein provide a suspension motion determiner module to determine a deflection of a suspension assembly that does not include a displacement sensor (e.g., ride height sensor, a potentiometer, a linear encoder, etc.) based on known deflections of other suspension assemblies included in the vehicle. In some examples, the suspension motion determine module further determines whether operation of the vehicle includes a roll event (for example, due to turning of the vehicles) or not does include a roll event (for example, due to approximately straight line driving of the vehicle).

For example, the suspension motion determiner module can determine operation of the vehicle includes a roll event based on at least a steering angle of the vehicle and a velocity of the vehicle. The suspension motion determiner module, in response to determining the operational mode of the vehicle, utilizes a first equation (e.g., calculation) to determine displacement of the suspension assembly when approximately no roll event is determined (e.g., detected) and utilizes a second equation (e.g., calculation) to determine displacement of the suspension assembly when the roll event is determined (e.g., detected).

As will be discussed in greater detail below in accordance with the teachings of this disclosure, the suspension motion determine module can have various configurations that may depend on a type of vehicle and/or a type of active and/or semi-active utilized by the vehicle. In examples disclosed herein, these configurations can be changed or altered to ensure the suspension motion determine module accurately calculates the deflection of a suspension assembly not including a ride height sensor.

Figure 1B:
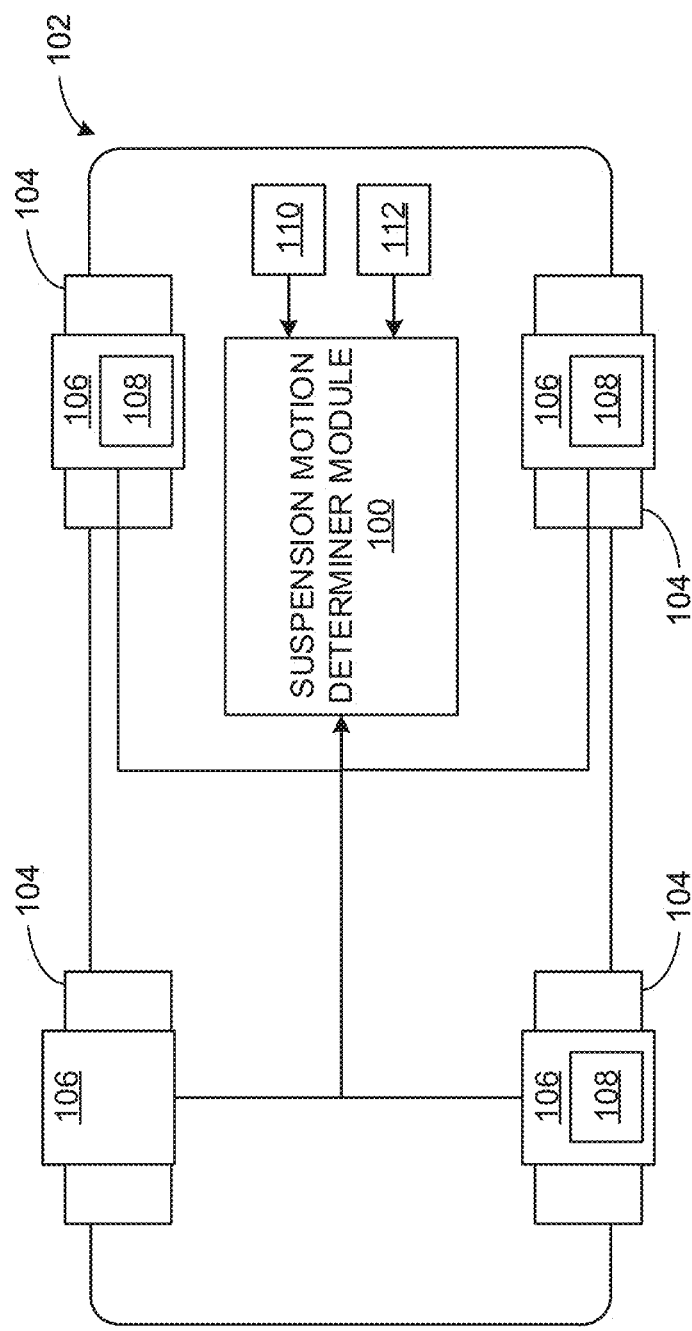
Figure 2:
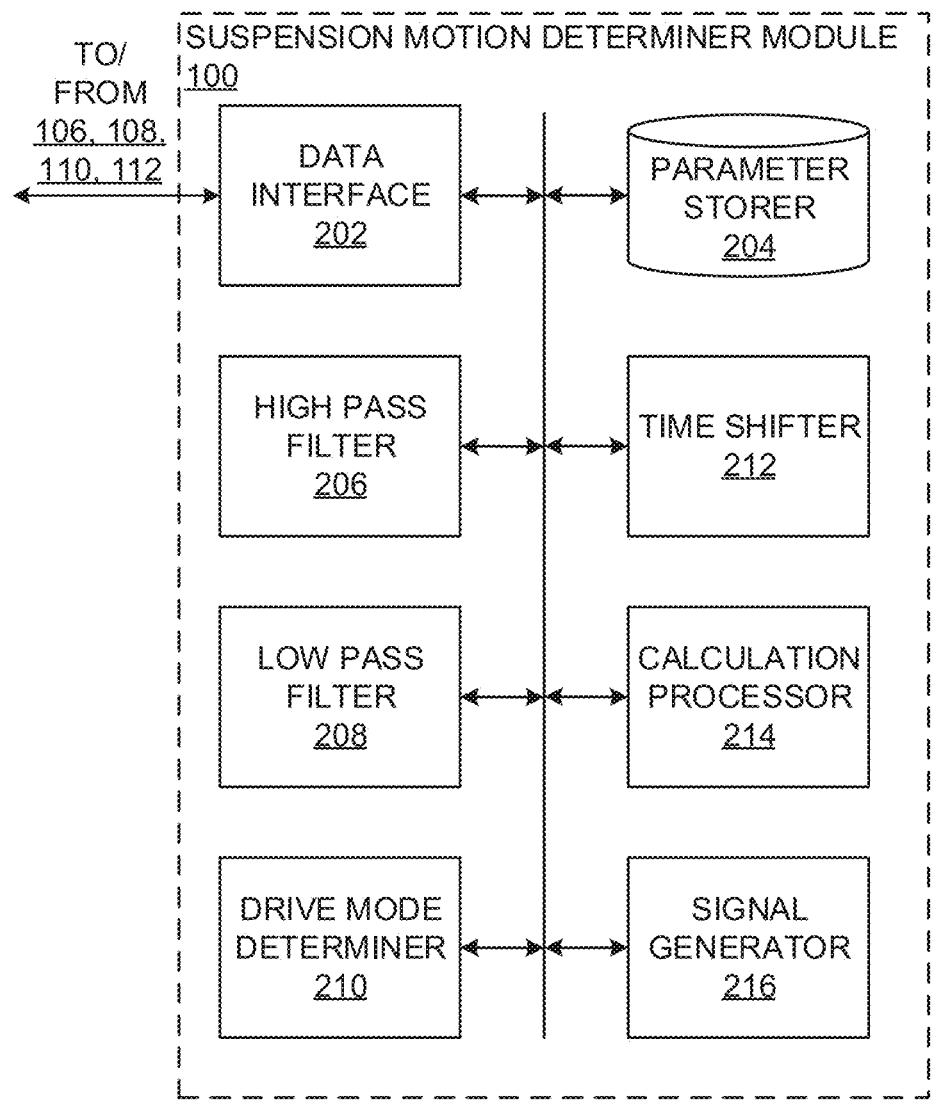
FIG. 2 is a block diagram further detailing the suspension motion determiner module of FIGS. 1A and 1B by which the examples disclosed herein can be implemented.

Turning to FIGS. 1A and 1B, an example suspension motion determiner module 100 is implemented or otherwise included in a vehicle 102. The suspension motion determiner module 100, described in further detail in conjunction with FIG. 2, is capable of determining a deflection of a suspension assembly.

The vehicle 102 further includes one or more wheels 104. In the illustrated example of FIG. 1A, while only three wheels 104 (front right, front left, and rear right) are illustrated, the vehicle 102 includes four wheels 104 (the rear left tire is obscured by the vehicle 102), as illustrated in FIG. 1B. Additionally, one or more of the wheels 104 can include a suspension assembly 106. In the illustrated example of FIGS. 1A and 1B, each of the wheels 104 includes respective suspension assemblies 106.

The suspension assemblies 106 include at least one of a spring or a damper to generate a deflection response of the suspension assembly 106 due to application of a load (e.g., increased/decreased weight of the vehicle 102, the vehicle 102 traveling over uneven terrain, etc.).

In some examples, a deflection of the suspension assemblies 106 can be electronically controlled. In such examples, the deflection can be modulated automatically by a processor (e.g., the deflection is modulated by a signal generated by the suspension motion determiner module 100) and/or by a user of the vehicle 102. Additionally or alternatively, the deflection commanded by the suspension assemblies 106 can be hydraulically (e.g., a servo controlling a hydraulic pump) and/or electromagnetically (e.g., electromagnetic motors coupled to the suspension assemblies 106) controlled.

The suspension assemblies 106, in some examples, further include example displacement sensors 108 to determine (e.g., measure) a deflection of the suspension assembly 106 associated with the displacement sensor 108. In the illustrated example of FIGS. 1A and 1B, three out of the four suspension assemblies 106 include respective displacement sensors 108. While in the illustrated example it is the rear left suspension assembly 106 that does not include a respective displacement sensor 108, any one of the suspension assemblies 106 may not include respective displacement sensors 108.

In some examples, the displacement sensors 108 can be ride height sensors. In such examples, the ride height sensors detect a distance between a mounting location of the ride height sensor (e.g., a mounting location on the vehicle 102, a mounting location on the suspension assemblies 106, etc.) and a point on the surface beneath the vehicle 102. Further in such examples, the measured distance between the mounting location and the surface beneath the vehicle 102 can be utilized (e.g., in conjunction with a correlation coefficient, an equation, etc.) to determine (e.g., calculate) deflection of the suspension assemblies 106. In other examples, the displacement sensors 108 can be a linear encoder, a potentiometer, or any other sensor capable of directly measuring the deflection of the suspension assemblies 106.

The steering angle sensor 110, included in or otherwise implemented by the vehicle 102, is capable of determining a steering angle of the vehicle 102. In some examples, the steering angle of the vehicle 102 is based upon an angle of the steered wheels of the wheels 104 (for example, the front wheels of the vehicle 102). The angle is based upon an angular deviation from a straight line orientation of the steered wheels. Further, in some examples, the steering angle sensor 110 can distribute the determined steering angle to the suspension motion determiner module 100 for processing.

The powertrain data collector 112, included in or otherwise implemented by the vehicle 102, is capable of determining and distributing one or more kinetic and/or kinematic parameters of the vehicle 102. In some examples, the kinetic parameters can include at least one of a torque and/or power output of the vehicle 102. Additionally, the kinematic parameters can include at least one of the position, the velocity, and/or the acceleration of the vehicle 102. In some examples, a torque output of the vehicle 102 and corresponding acceleration of the vehicle 102 are utilized to approximate a mass of the vehicle 102. Further, in some examples, the powertrain data collector 112 can distribute one or more kinetic and/or kinematic parameters of the vehicle 102 to the suspension motion determiner module 100 for processing.

FIG. 2 is a block diagram of the example suspension motion determiner module 100 included in the example vehicle 102 of FIGS. 1A and 1B. The suspension motion determiner module 100 can, in some examples such as the illustrated example of FIG. 2, include an example data interface 202, an example parameter storer 204, an example high pass filter 206, an example low pass filter 208, an example drive mode determiner 210, an example time shifter 212, an example calculation processor 214, and an example signal generator 216.

The example data interface 202, included in or otherwise implemented by the example suspension motion determiner module 100, is capable of receiving data from and/or distributing data to at least one of the suspension assemblies 106, the displacement sensors 108, the steering angle sensor 110, and/or the powertrain data collector 112 of FIGS. 1A and 1B. The data interface 202 is further capable of distributing received data to and/or receiving calculated values from at least one of the parameter storer 204, the high pass filter 206, the low pass filter 208, the drive mode determiner 210, the time shifter 212, the calculation processor 214, and/or the signal generator 216. For example, the data interface 202 can distribute data from at least one of the steering angle sensor 110 and the powertrain data collector 112 to the drive mode determiner 210 such that the drive mode determiner 210 can determine a current mode of the vehicle 102. In other examples, the data interface 202 can distribute a signal from the signal generator 216 to one of the suspension assemblies 106, the signal to act as feedback to control one of the suspension assemblies 106 when it is active and/or semi-active.

The example parameter storer 204, included in or otherwise implemented by the example suspension motion determiner module 100, is capable of storing characteristics for at least one of the vehicle 102, the suspension assemblies 106, and/or the displacement sensors 108 (e.g., a make and/or model of the vehicle 102, a wheelbase of the vehicle 102, a stiffness of the suspension assemblies 106, a position of the displacement sensors 108, etc.), thresholds (e.g., limits) for one or more parameters (e.g., suspension deflection limits, steering angle limits, etc.), and values calculated by one or more components of the suspension motion determiner module 100, among others.

Further, the parameter storer 204 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The parameter storer 204 may additionally or alternatively be implemented by one or more double data rate (DDR) memories, such as DDR, DDR2, DDR3, mobile DDR (mDDR), etc. The parameter storer 204 may additionally or alternatively be implemented by one or more mass storage devices such as hard disk drive(s), compact disk drive(s), digital versatile disk drive(s), etc. While in the illustrated example the parameter storer 204 is illustrated as a single database, the parameter storer 204 may be implemented by any number and/or type(s) of databases. Further, the parameter storer 204 be located in the vehicle 102 or at a central location outside of the vehicle 102. Furthermore, the data stored in the parameter storer 204 may be in any data format such as, for example, binary data, comma delimited data, tab delimited data, structured query language (SQL) structures, etc.

The example high pass filter 206 and the example low pass filter 208, included in or otherwise implemented by the example suspension motion determiner module 100, are capable of applying a high pass filter to the sets of displacement data obtained from the displacement sensors 108 by the data interface 202 and applying a low pass filter to the sets of displacement data obtained from the displacement sensors 108 by the data interface 202, respectively.

In general, the filter applied by the high pass filter 206 attenuates signals below a predetermined frequency (e.g., 5 Hz, 8 Hz, etc.) which has the technical effect of removing the low frequency components of a signal, wherein only a high frequency component remains. Applying the high pass filter 206 to the sets of displacement data, in some examples, yields the displacement of the wheel 104 of the vehicle 102 associated with the respective suspension assembly 106 (e.g., the displacement data for the left front suspension assembly 106 is associated with the left front wheel 104 of the vehicle 102, etc.).

Conversely, the filter applied by the low pass filter 208 attenuates signals above a predetermined frequency (e.g., 1.5 Hz, 2 Hz, etc.) which has the technical effect of removing the high frequency components of a signal, wherein only a low frequency component remains. Applying the low pass filter to the sets of displacement data, in some examples, yields the displacement of a portion of the body of the vehicle 102 associated with the respective suspension assembly 106 (e.g., the displacement data for the right front suspension assembly 106 is associated with the right front corner of the body of the vehicle 102, etc.).

Figure 3:
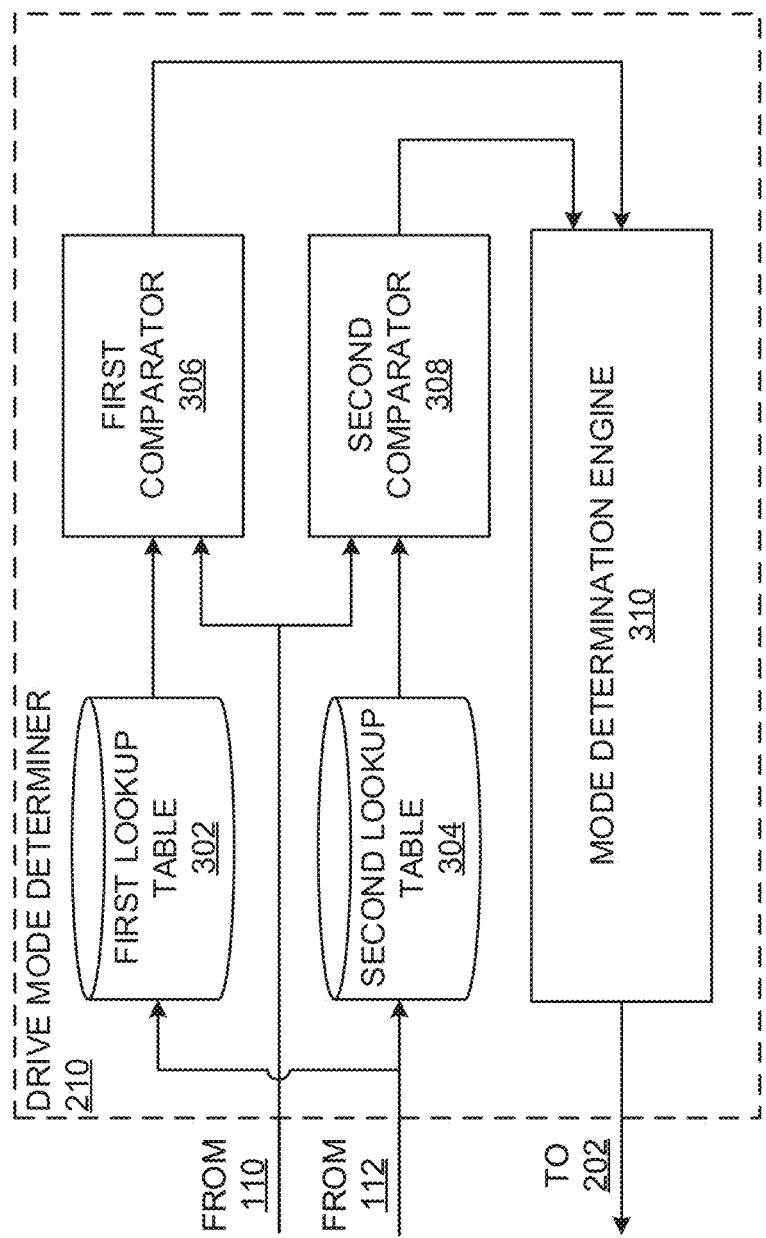
FIG. 3 is a block diagram further detailing a drive mode determiner included in the suspension motion determiner module of FIGS. 1A, 1B, and 2 by which the examples disclosed herein can be implemented.

The example drive mode determiner 210, included in or otherwise implemented by the example suspension motion determiner module 100 and further described in conjunction with FIG. 3, is capable of determining whether the vehicle 102 is utilized in a first mode (e.g., no roll event, straight line driving, etc.) or a second mode (e.g., roll event, turning, etc.) based upon at least a steering angle of the vehicle 102 as measured by the steering angle sensor 110 and a speed of the vehicle 102 as measured by the powertrain data collector 112. In response to determining the mode, the drive mode determiner 210 can distribute the determined mode to at least the calculation processor 214.

The example time shifter 212, included in or otherwise implemented by the example suspension motion determiner module 100, is capable of determining a transport delay between the front wheels 104 of the vehicle 102 and the rear wheels 104 of the vehicle 102. For example, the transport delay is based upon a time delay between when the front wheels 104 encounter a given terrain and the rear wheels 104 encounter the same given terrain. In some examples, the time delay is based on at least one of a speed of the vehicle 102 ($V_{vehicle}$) obtained from the powertrain data collector 112, a sampling frequency of the displacement data (sampling frequency), and a wheel base (e.g., a longitudinal displacement between the front wheels 104 and the rear wheels 106 (wheelbase)) of the vehicle 102 obtained from the parameter storer 204. Thus, for example, the delayed deflection of the front wheels 104 (for example, the front right wheel ($Z_{wheel\_FR}$)) is based upon Eq. (1) as reproduced below:

$$TransportDelay(z_{wheel_{FR}}) = \frac{1}{z^x}[z_{wheel_{FR}}], \quad \text{Eq. 1}$$

$$\text{where } x = \left(\frac{wheelbase}{V_{Vechicle}}\right) * Fs \text{ (sampling frequency)}$$

Additionally, when calculating the deflection of the front wheels 104 of the vehicle 102, the time shifter 212 takes into account a motion ratio (Front2RearWheelRatio), which is a ratio of an expected motion of the rear wheels in response to an input compared to an expected motion of the front wheels in response to the same input. Thus, for example, the delayed deflection of the front wheels 104 (for example, the front right wheel ($Z_{wheel\_FR\_Delayed}$)) is further based upon Eq. (2) as reproduced below:

$$z_{wheel\_FR\_Delayed} = \text{TransportDelay}(z_{wheel_{FR}}) * \text{Front2RearWheelRatio} \quad \text{Eq. 2}$$

The example calculation processor 214, included in or otherwise implemented by the example suspension motion determiner module 100, is capable of completing one or more calculations required to determine the displacement of the suspension assembly 106 that does not include respective displacement sensor 108.

For example, the calculation processor 214 is capable of determining an offset of the suspension assembly 106 (e.g., displacement of a portion of the body of the vehicle 102 associated with the respective suspension assembly 106, similar to the values calculated by the low pass filter 208) that does not include the respective displacement sensor 108 based on the values calculated by the low pass filter 208 and the high pass filter 206. This is done for the right rear wheel 104, for example, with Eq. (3), which includes the offset of the right rear wheel 104 ($Z_{Offset\_RR}$), displacement of the front right wheel 104 ($Z_{wheel\_FR}$), displacement of the rear left wheel 104 ($Z_{wheel\_RL}$), and displacement of the front left wheel 104 (($Z_{wheel\_FL}$) and is reproduced below:

$$z_{Offset\_RR} = LPF(z_{wheel_{FR}} + z_{wheel_{RL}} - z_{wheel_{FL}}) \quad \text{Eq. 3}$$

Additionally, in response to the drive mode determiner 210 determining no roll event for the vehicle 102, the calculation processor 214 calculates a deflection (e.g., a displacement) of the suspension assembly 106 that does not include the respective displacement sensor 108 based upon a first calculation. For example, when considering the right rear wheel 104 (the left rear wheel 104 can additionally or alternatively be considered), the calculation processor 214 utilizes Eq. (4), which includes the deflection of the right rear suspension assembly 106 ($Z_{susp\_RR}$), displacement of the body of the vehicle 102 associated with the rear left of the vehicle 102 ($Z_{body\_RL}$), displacement of the front right wheel 104 including the time shift calculated by the time shifter 212 ($Z_{wheel\_FR\_delayed}$), and offset of the right rear wheel 104 ($Z_{Offset\_RR}$) and is reproduced below:

$$z_{Susp\_RR} = z_{body\_RL} + z_{wheel\_FR\_Delayed} + z_{Offset\_RR} \quad \text{Eq. 4}$$

Additionally, in response to the drive mode determiner 210 determining (e.g., detecting) a roll event of the vehicle 102, the calculation processor 214 calculates a deflection (e.g., a displacement) of the suspension assembly 106 that does not include the respective displacement sensor 108 based upon a second calculation. For example, when considering the right rear wheel 104 (the left rear wheel 104 can additionally or alternatively be considered), the calculation processor 214 utilizes Eq. (5), which includes the deflection of the right rear suspension assembly 106 ($Z_{susp\_RR}$), displacement of the body of the vehicle 102 associated with the front right of the vehicle 102 ($Z_{body\_FR}$), displacement of the body of the vehicle 102 associated with the rear left of the vehicle 102 ($Z_{body\_RL}$), displacement of the body of the vehicle 102 associated with the front left of the vehicle 102 ($Z_{body\_FL}$), displacement of the front right wheel 104 including the time shift calculated by the time shifter 212 ($Z_{wheel\_FR\_delayed}$), and offset of the right rear wheel 104 ($Z_{Offset\_RR}$) and is reproduced below:

$$z_{Susp\_RR} = Z_{body\_FR} + Z_{body\_RL} - z_{body\_FL} + z_{wheel\_FR\text{-}Delayed} + z_{Offset\_RR} \quad \text{Eq. (5)}$$

The example signal generator 216, included in or otherwise implemented by the example suspension motion determiner module 100, is capable of generating a signal corresponding to the calculated deflection of the suspension assembly 106 as calculated by the calculation processor 214. In some examples, the generated signal is an analog voltage corresponding to the calculated deflection. Additionally or alternatively, the signal generated may be a data packet including a digital representation (e.g., a hex value based on a communication protocol data packet) of the calculated deflection.

In some examples, the example signal generator 216 is further capable of outputting the signal via the data interface 202 to the suspension assembly 106 that does not include respective displacement sensor 108. In some examples, the signal output by the signal generator 216 is further to act as feedback to control the suspension assembly 106 when the suspension assembly 106 is active and/or semi-active.

FIG. 3 is a block diagram of the example drive mode determiner 210 included in the example suspension motion determiner module 100 of FIG. 2. The drive mode determiner 210 can, in some examples such as the illustrated example of FIG. 3, include an example first lookup table 302, an example second lookup table 304, an example first comparator 306, an example second comparator 308, and an example mode determination engine 310.

The example first lookup table 302 and the example second lookup table 304, included in or otherwise implemented by the example drive mode determiner 210, are capable of storing lookup tables of a first steering angle limit and a second steering angle limit, respectively, for the vehicle 102 associated with corresponding velocities of the vehicle 102. In some examples, velocity values of the vehicle 102 are obtained from the powertrain data collector 112 via the data interface 202 and the first and second steering angle limits are based upon at least one of predetermined values (e.g., as determined by a manufacturer of the vehicle 102, an owner of the vehicle 102, etc.) or dynamic values that vary with determined performance of the vehicle 102. In some examples, a different relationship (e.g., correlation) between velocity of the vehicle 102 and steering angle limit is utilized by each of the first lookup table 302 and the second lookup table 304. In such examples, the first steering angle limit and the second steering angle limit corresponding to a velocity of the vehicle 102 will be unique values (e.g., the first steering angle limit is 5 degrees and the second steering angle limit is 10 degrees when the vehicle velocity is 10 miles per hour, etc.).

The first lookup table 302 and the second lookup table 304 can be queried with a velocity value of the vehicle 102 measured by the powertrain data collector 112. In some examples, the same velocity value is distributed to each of the first lookup table 302 and the second lookup table 304. In other examples, a unique velocity value can be distributed to each of the first lookup table 302 and the second lookup table 304. Further, the first lookup table 302 and the second lookup table 304 can, based on the queries, output a corresponding first steering angle limit and a corresponding second steering angle limit, respectively.

The first lookup table 302 and the second lookup table 304 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The first lookup table 302 and the second lookup table 304 may additionally or alternatively be implemented by one or more double data rate (DDR) memories, such as DDR, DDR2, DDR3, mobile DDR (mDDR), etc. The first lookup table 302 and the second lookup table 304 may additionally or alternatively be implemented by one or more mass storage devices such as hard disk drive(s), compact disk drive(s), digital versatile disk drive(s), etc. While in the illustrated example first lookup table 302 and the second lookup table 304 are illustrated as single databases, the first lookup table 302 and the second lookup table 304 may be implemented by any number and/or type(s) of databases. Further, the first lookup table 302 and the second lookup table 304 may be located in the vehicle 102 or at a central location outside of the vehicle 102. Furthermore, the data stored in the first lookup table 302 and the second lookup table 304 may be in any data format such as, for example, binary data, comma delimited data, tab delimited data, structured query language (SQL) structures, etc.

The example first comparator 306 and the example second comparator 308, included in or otherwise implemented by the example drive mode determiner 210, are capable of comparing the first steering angle limit received from the first lookup table 302 and the second steering angle limit received from the second lookup table 304, respectively, to the steering angle of the vehicle 102 as obtained from the steering angle sensor 110 of FIGS. 1A and 1B via the data interface 202. The first comparator 306 and the second comparator 308 are further to distribute the results of respective comparisons completed to the example mode determination engine 310.

In some examples, the results of the respective comparisons further includes a notification of a satisfaction of at least one of the first steering angle limit as determined by the first comparator 306 and/or the second steering angle limit as determined by the second comparator 308. In such examples, determining satisfaction of the first steering angle limit with the first comparator 306 further includes determining whether the steering angle of the vehicle 102 is less than the first steering angle limit and determining satisfaction of the second steering angle limit with the second comparator 308 further includes determining whether the steering angle of the vehicle 102 is greater than the second steering angle limit.

The example mode determination engine 310, included in or otherwise implemented by the example drive mode determiner 210, is capable of determining a driving mode of the vehicle 102 based on the results of the comparisons completed by the first comparator 306 and the second comparator 308. In some examples, the example drive mode determiner 210 obtains the results of the comparisons completed in the form of a satisfaction status (e.g., satisfied or not satisfied) of at least the first steering angle limit and the second steering angle limit.

In response to determining that only the first steering angle limit is satisfied (e.g., the steering angle is less than the first steering angle limit), the drive mode determiner 210 determines the vehicle 102 is utilized in a first mode (e.g., no roll event, approximately straight line driving, etc.). Additionally, in response to determining that only the second steering angle limit is satisfied (e.g., the steering angle is greater than the second steering angle limit), the drive mode determiner 210 determines that the vehicle 102 is utilized in a second mode (e.g., roll event, turning, steering, driving in a turn, etc.).

Additionally, in response to determining neither of the first steering angle limit and the second steering angle limit is satisfied (e.g., the steering angle is greater than the first steering angle limit and less than the second steering angle limit), the drive mode determiner 210 sets the mode of the vehicle 102 to a previously determined mode. In some examples, the previous mode is stored in the drive mode determiner 210. Additionally or alternatively, the previous mode is stored in the parameter storer 204 and is retrieved by the drive mode determiner 210. In response to determining the mode of the vehicle 102, the mode determination engine 310 is further to distribute a notification including the determined mode to the data interface 202 for distribution to at least the parameter storer 204 and the calculation processor 214 of FIG. 2.

While an example manner of implementing the example suspension motion determiner module 100 of FIGS. 1A and 1B is illustrated in FIGS. 2 and 3, one or more of the elements, processes and/or devices illustrated in FIGS. 2 and 3 may be combined, divided, re-arranged, omitted, eliminated and/or implemented in any other way. Further, the example data interface 202, the example high pass filter 206, the example low pass filter 208, the example drive mode determiner 210, the example time shifter 212, the example calculation processor 214, the example signal generator 216, the example first comparator 306, the example second comparator 308, the example mode determination engine 310, and/or, more generally, the example suspension motion determiner module 100 of FIGS. 1A and 1B may be implemented by hardware, software, firmware and/or any combination of hardware, software and/or firmware. Thus, for example, any of the example data interface 202, the example high pass filter 206, the example low pass filter 208, the example drive mode determiner 210, the example time shifter 212, the example calculation processor 214, the example signal generator 216, the example first comparator 306, the example second comparator 308, the example mode determination engine 310, and/or, more generally, the example suspension motion determiner module 100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data interface 202, the example high pass filter 206, the example low pass filter 208, the example drive mode determiner 210, the example time shifter 212, the example calculation processor 214, the example signal generator 216, the example first comparator 306, the example second comparator 308, and/or the example mode determination engine 310 is/are hereby expressly defined to include a non-transitory computer readable storage device or storage disk such as a memory, a digital versatile disk (DVD), a compact disk (CD), a Blu-ray disk, etc. including the software and/or firmware. Further still, the example suspension motion determiner module 100 of FIGS. 1A and 1B may include one or more elements, processes and/or devices in addition to, or instead of, those illustrated in FIGS. 2 and 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
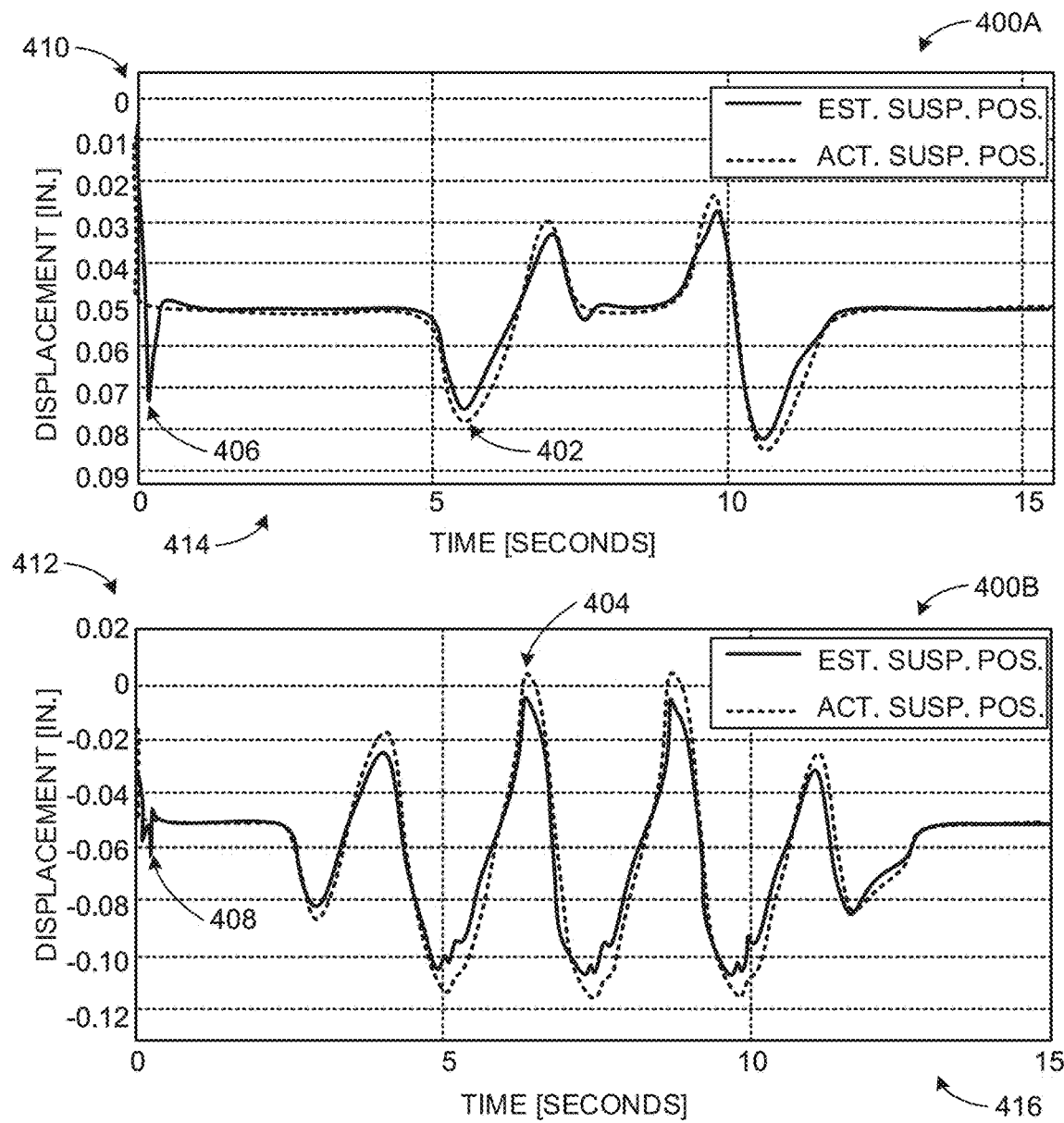
FIG. 4 illustrates example plots comparing experimental suspension deflection data to calculated suspension deflection data as calculated by the suspension motion determiner module of FIGS. 1A, 1B, and 2 for various driving conditions.

FIG. 4 illustrates plots 400A, 400B of example suspension motion profiles, the plot 400A illustrating motion profiles for an example double lane change and the plot 400B illustrating motion profiles for an example 18 meter slalom. Each of the plots 400A, 400B includes a first profile (a first measured profile 402 and a second measured profile 404) corresponding to measured suspension motion profiles (e.g., measured by the displacement sensors 108 of FIGS. 1A and 1B) in addition to a second profile (a first calculated profile 406 and a second calculated profile 408) as calculated by the example suspension motion determiner module 100 of FIGS. 1A, 1B, and 2. Further, the plot 400A illustrates the first calculated profile 406 generally tracking the first measured profile 402 and the plot 400B illustrates the second calculated profile 408 generally tracking the second measured profile 404.

The plots 400A, 400B further include vertical axes 410, 412 corresponding to a displacement (e.g., deflection) of one of the suspension assemblies 106 of FIGS. 1A and 1B. In the illustrated example of FIG. 4, the vertical axis 410 corresponds to a suspension displacement (e.g., deflection) ranging from 0 inches to 0.09 inches and the vertical axis 412 corresponds to a suspension displacement (e.g., deflection) ranging from 0.02 inches to −0.12 inches. However, the displacement of the suspension can be any value up to the maximum allowable deflection of the suspension. The plots 400A, 400B additionally include horizontal axes 414, 416 corresponding to a time in seconds. In the illustrated example of FIG. 4, the horizontal axes 414, 416 each correspond to a time ranging from 0 seconds to 15 seconds.

Figure 5:
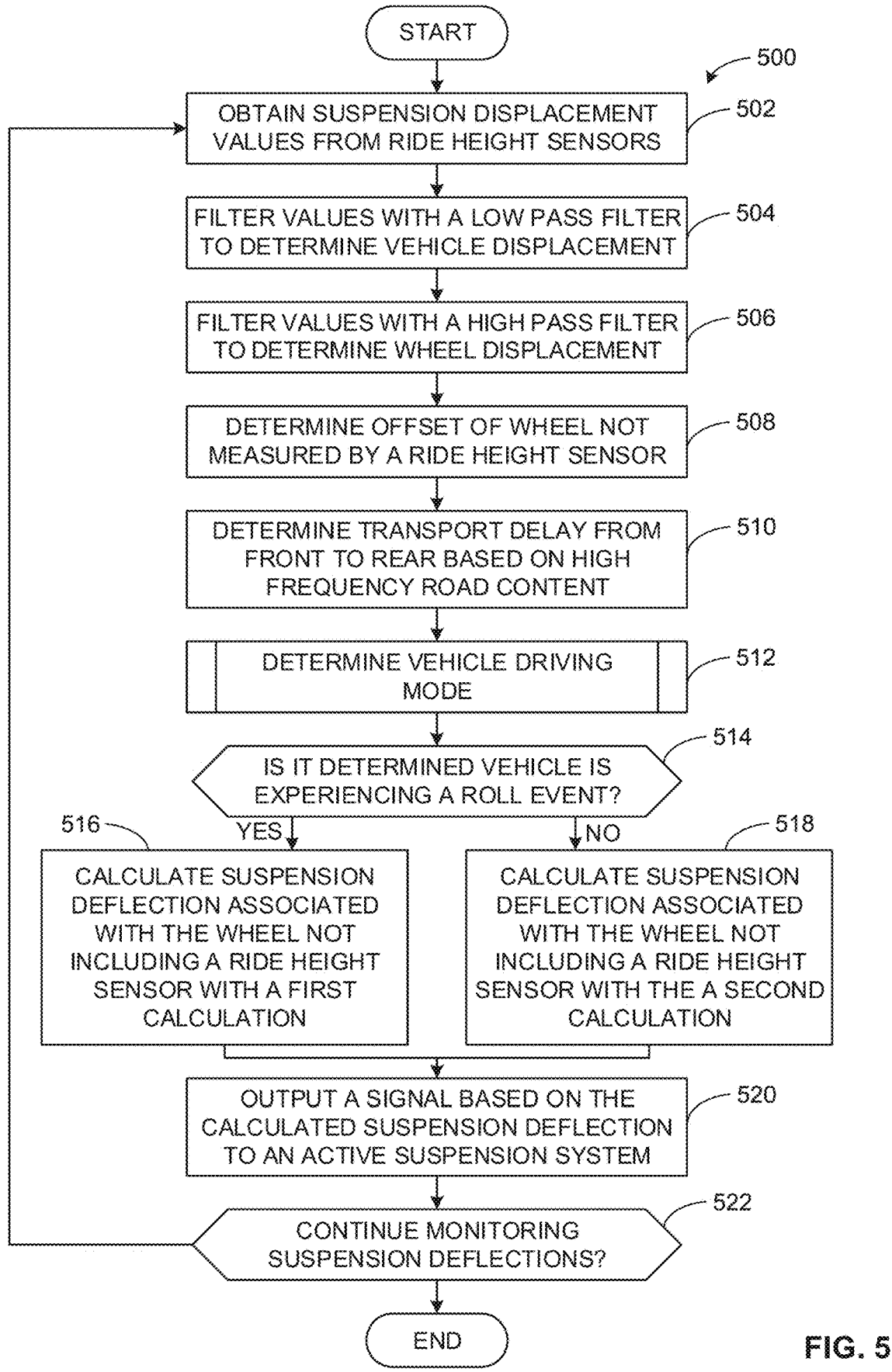
FIG. 5 is a flowchart representative of an example method that may be performed using the suspension motion determiner module of FIGS. 1A, 1B, and 2 to calculate deflection of a suspension assembly not measured by a sensor.
Figure 6:
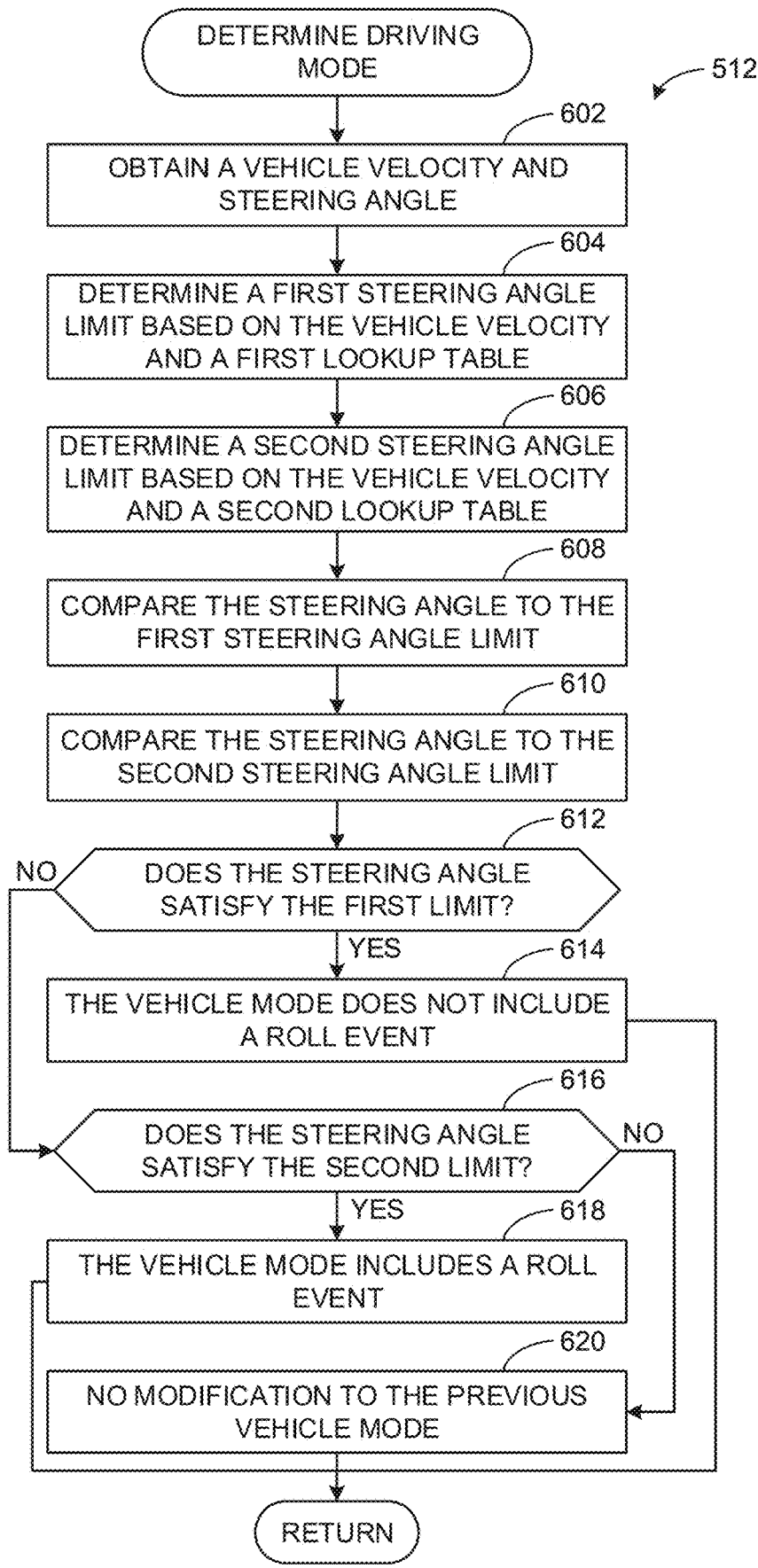
FIG. 6 is a flowchart representative of an example method that may be performed using the drive mode determiner of FIGS. 2 and 3 to determine a drive mode of the vehicle.

Flowcharts representative of example hardware logic, machine readable instructions, hardware implemented state machines, and/or any combination thereof for implementing the suspension motion determiner module 100 of FIG. 2 is shown in FIG. 5-6. The machine readable instructions may be an executable program or portion of an executable program for execution by a computer processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowcharts illustrated in FIGS. 5-6, many other methods of implementing the example suspension motion determiner module 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 5-6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

An example method 500 to determine (e.g., calculate) a deflection of the suspension assembly 106 that does not include the displacement sensor 108 with the example suspension motion determiner module 100 is illustrated in FIG. 5 and begins at block 502. At block 502, the data interface 202 obtains displacement data of the suspension assemblies 106 including the displacement sensors 108 from the displacement sensors 108. So, for example, for the example vehicle 102 including four suspension assemblies 106 and three displacement sensors 108, the data interface can receive three sets of displacement data.

At block 504, the example low pass filter 208 applies a low pass filter to the sets of displacement data obtained from the displacement sensors 108 via the data interface 202 at block 502. Applying the low pass filter to the sets of displacement data, in some examples, yields the displacement of a portion of the body of the vehicle 102 associated with the respective suspension assembly 106 (e.g., the displacement data for the right front suspension assembly 106 is associated with the right front corner of the body of the vehicle 102, etc.).

At block 506, the example high pass filter 206 applies a high pass filter to the sets of displacement data obtained from the displacement sensors 108 via the data interface 202 at block 502. Applying the high pass filter to the sets of displacement data, in some examples, yields the displacement of the wheel 104 of the vehicle 102 associated with the respective suspension assembly 106 (e.g., the displacement data for the left front suspension assembly 106 is associated with the left front wheel 104 of the vehicle 102, etc.).

At block 508, the example calculation processor 214 determines an offset of the suspension assembly 106 that does not include the respective displacement sensor 108 based on the values calculated by the low pass filter 208 and the high pass filter 206 at blocks 504 and block 506, respectively.

At block 510, once the offset value is calculated at block 508, the time shifter 212 determines a transport delay between the front wheels 104 of the vehicle 102 and the rear wheels 104 of the vehicle 102. In some examples, the time delay is based on at least one of a speed of the vehicle 102 obtained from the powertrain data collector 112 and a wheelbase of the vehicle 102 obtained from the parameter storer 204. In some examples, the transport delay is based upon a time delay when the front wheels 104 encounter a given terrain and the rear wheels 104 encounter the same given terrain.

At block 512, described further in conjunction with FIG. 6, the drive mode determiner 210 determines whether the vehicle 102 is utilized in a first mode (e.g., no roll event, straight line driving, etc.) or a second mode (e.g., roll event, turning, etc.) based upon at least a steering angle of the vehicle 102 as measured by the steering angle sensor 110 and a speed of the vehicle 102 as measured by the powertrain data collector 112. In response to determining the mode, processing proceeds to block 514.

At block 514, in response to the drive mode determiner 210 determining no roll event for the vehicle 102 (e.g., the vehicle is driving in a straight line, etc.), processing proceeds to block 516. Alternatively, in response to the drive mode determiner 210 determining a roll event for the vehicle 102 (e.g., the vehicle 102 is turning, etc.) at block 512, processing proceeds to block 518.

At block 516, in response to the drive mode determiner 210 determining no roll event for the vehicle 102 at block 512, the calculation processor 214 calculates deflection (e.g., displacement) of the suspension assembly 106 that does not include the respective displacement sensor 108 based upon a first calculation such as Eq. (4) further discussed in conjunction with the calculation processor 214 of FIG. 2.

At block 518, in response to the drive mode determiner 210 determining a roll event for the vehicle 102 at block 512, the calculation processor 214 calculates deflection (e.g., displacement) of the suspension assembly 106 that does not include the respective displacement sensor 108 based upon a second calculation such as Eq. (5) further discussed in conjunction with the calculation processor 214 of FIG. 2.

At block 520, the signal generator 216 outputs a signal via the data interface 202 to the suspension assembly 106 that does not include the respective displacement sensor 108 based upon the deflection calculated at one of block 516 or block 518. In some examples, the signal output by the signal generator 216 is further to act as feedback to control the suspension assembly 106 when the suspension assembly 106 is active and/or semi-active.

At block 522, the suspension motion determiner module 100 determines whether it is desired to continue monitoring (e.g., calculating) the deflection of the suspension system 106 not including the displacement sensor 108. In response to determining monitoring is desired, processing returns to block 502. Conversely, in response to determining monitoring is no longer desired, the example method 500 of FIG. 5 ends.

An example method that can be executed to implement the example drive mode determiner 210 by determining a driving mode of the vehicle 102 (FIG. 5, block 512) is illustrated in FIG. 6. With reference to the preceding figures and associated descriptions, the example method 512 of FIG. 6 begins execution at block 602, at which at least a steering angle of the vehicle 102 as measured by the steering angle sensor 110 and a speed of the vehicle 102 as measured by the powertrain data collector 112 is obtained by the drive mode determiner 210.

At block 604 and 606, the first lookup table 302 and the second lookup table 304 determine a first steering angle limit and a second steering angle limit, respectively, wherein each of the first steering angle limit and the second steering angle limit are based upon a current velocity of the vehicle 102. For example, the first steering angle limit may be 5 degrees and the second steering angle may be 10 degrees when the velocity of the vehicle 102 is 20 miles per hour, and the first steering angle limit may be 2.5 degrees and the second steering angle may be 5 degrees when the velocity of the vehicle 102 is 40 miles per hour. In some examples, the deviation between the first steering angle limit and the second steering angle limit ensures that signal noise in the present steering angle does not cause the steering angle to oscillate between satisfying the first steering angle limit and the second steering angle limit.

At block 608 and 610, the first comparator 306 and the second comparator 308 compare a current steering angle as determined by the steering angle sensor 110 to the first steering angle limit determined by the first lookup table 302 at block 604 and the second steering angle limit determined by the second lookup table 304 at block 606, respectively. In some examples, the comparison is further to determine whether the current steering angle satisfies at least one of the first steering angle limit or the second steering angle limit, respectively. In some examples, at block 608, the steering angle satisfies the first steering angle limit when the steering angle is determined to be less than the first steering angle limit. Similarly, in some examples at block 610, the steering angle satisfies the second steering angle limit when the steering angle is determined to be greater than the second steering angle limit.

At block 612, the mode determination engine 310 determines whether the steering angle obtained at block 602 satisfies the first steering angle limit determined at block 604 based on the comparison of block 608. In response to determining the steering angle satisfies the first limit, processing proceeds to block 614. Alternatively, in response to determining the steering angle does not satisfy the first limit, processing proceeds to block 616.

At block 614, the mode determination engine 310 determines the mode of the vehicle does not include a roll event based upon the steering angle satisfying the first steering angle limit and distributes the notification to at least one of the parameter storer 204 and the calculation processor 214 via the data interface 202. Upon distribution of the notification, the example method 512 of FIG. 6 ends and processing returns to block 514 of the example method 500 of FIG. 5.

At block 616, the mode determination engine 310 determines whether the steering angle obtained at block 602 satisfies the second steering angle limit determined at block 606 based on the comparison of block 610. In response to determining the steering angle satisfies the second steering angle limit, processing proceeds to block 618. Alternatively, in response to determining the steering angle does not satisfy the second steering angle limit calculated at block 606, processing proceeds to block 620.

At block 618, the mode determination engine 310 determines the mode of the vehicle includes a roll event based upon the steering angle satisfying the second steering angle limit and distributes the notification to at least one of the parameter storer 204 and the calculation processor 214 via the data interface 202. Upon distribution of the notification, the example method 512 of FIG. 6 ends and processing returns to block 514 of the example method 500 of FIG. 5.

At block 620, the mode determination engine 310 determines the mode of the vehicle corresponds to a previously determined mode of the vehicle 102 (e.g., the last determined mode of the vehicle 102) based upon the steering angle satisfying neither of the first steering angle limit and the second steering angle limit. In such examples, the mode determination engine 310 further distributes the notification to at least one of the parameter storer 204 and the calculation processor 214 via the data interface 202. Upon distribution of the notification, the example method 512 of FIG. 6 ends and processing returns to block 514 of the example method 500 of FIG. 5.

Figure 7:
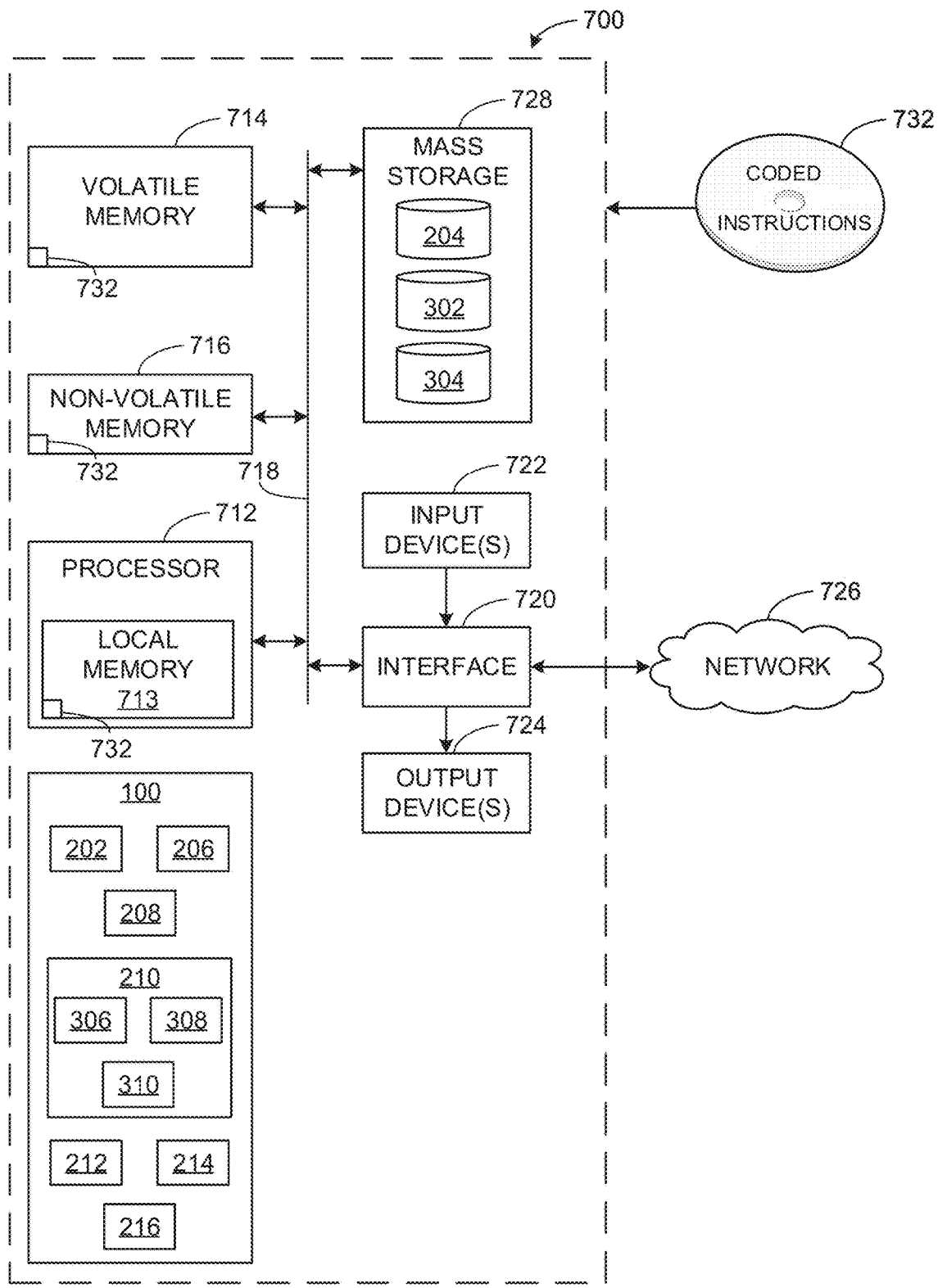
FIG. 7 is a block diagram of an example processing platform structured to execute machine readable instructions to implement the methods of FIGS. 5 and 6 and the example suspension motion determiner module of FIGS. 1A, 1B, and 2.

FIG. 7 is a block diagram of an example processor platform 700 structured to execute the instructions of FIGS. 5-6 to implement the example suspension motion determiner module 100 of FIGS. 1A, 1B, and 2. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example data interface 202, the example high pass filter 206, the example low pass filter 208, the example drive mode determiner 210, the example time shifter 212, the example calculation processor 214, the example signal generator 216, the example first comparator 306, the example second comparator 308, and the example mode determination engine 310.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives. In the illustrated example of FIG. 7, the one or more mass storage devices 728 are further to implement the example parameter storer 204, the example first lookup table 302, and the example second lookup table 304.

The machine executable instructions 732 of FIGS. 5-6 may be stored in the mass storage device 728, in the volatile memory 714, in the non-volatile memory 716, and/or on a removable non-transitory computer readable storage medium such as a CD or DVD.

From the foregoing, it will be appreciated that example methods, apparatus and articles of manufacture have been disclosed that determine (e.g., calculate) a deflection of a suspension assembly based on measured deflections of other suspension assemblies included in a vehicle. The calculation of the deflection of the suspension assembly reduces a quantity of displacement sensors (e.g., ride height sensors) required to be included in the vehicle. This reduction both a) decreases the build cost of the vehicle by eliminating the cost of a ride height sensor, associated wiring, and associated assembly cost and b) increases the reliability of the vehicle by decreasing the quantity of components (e.g., potential failure points) of the vehicle.

Example 1 includes an apparatus comprising a drive mode determiner to determine a mode of a vehicle, a calculation processor to calculate deflection of a first suspension assembly based on a deflection of a second suspension assembly, and a first or a second calculation when the vehicle is utilized in a first mode or a second mode, respectively, and a signal generator to output a signal to control the first suspension assembly based upon the calculated deflection.

Example 2 includes the apparatus of example 1, further including a low pass filter to filter the deflection of the second suspension assembly to determine a position of a body of the vehicle at a location approximate the second suspension assembly, and a high pass filter to filter the deflection of the second suspension assembly to determine a position of a wheel of the vehicle, the wheel coupled to the second suspension assembly.

Example 3 includes the apparatus of example 1, further including a time shifter to time shift the deflection of the second suspension assembly when there is a longitudinal displacement between the second suspension assembly and the first suspension assembly, the time shift based upon at least a speed and a wheel base of the vehicle.

Example 4 includes the apparatus of example 1, wherein the mode of the vehicle is based on at least a speed and a steering angle of the vehicle and the first mode of the vehicle does not include a roll event and the second mode of the vehicle includes the roll event.

Example 5 includes the apparatus of example 4, wherein the drive mode determiner further includes a first and second lookup table to determine a first and second steering angle limit based upon the speed of the vehicle, a first and second comparator to compare the steering angle of the vehicle to the first and second steering angle limits, respectively, and a mode determination engine to determine whether the vehicle is utilized in the first mode or the second mode based on the steering angle of the vehicle satisfying the first steering angle limit or the second steering angle limit.

Example 6 includes the apparatus of example 5, wherein the mode determination engine is further to determine the vehicle is utilized in the first mode when the steering angle satisfies the first steering angle limit, determine the vehicle is utilized in the second mode when the steering angle satisfies the second steering angle limit, and determine the vehicle is utilized in a previously determined mode when the steering angle does not satisfy either of the first and second steering angle limits.

Example 7 includes the apparatus of example 1, further including a data interface to receive deflection of the second, a third, and a fourth suspension assembly of the vehicle, and the calculation processor determines the deflection of the first suspension assembly based on the first or second calculation and the deflection of the second, third, and fourth suspension assemblies.

Example 8 includes an apparatus comprising a suspension motion determiner module programmed to output a signal to a first suspension assembly of a vehicle based on a first deflection of the first suspension assembly, the first deflection calculated based on a calculation and a second deflection of a second suspension assembly of the vehicle, the calculation selected based on whether the vehicle is utilized in a first mode or a second mode.

Example 9 includes the apparatus of example 8, wherein the suspension motion determiner module is further programmed to filter the second deflection of the second suspension assembly with a low pass filter to determine a position of a body of the vehicle at a location approximate the second suspension assembly, and filter the second deflection of the second suspension assembly with a high pass filter to determine a position of a wheel of the vehicle, the wheel coupled to the second suspension assembly.

Example 10 includes the apparatus of example 8, wherein the suspension motion determiner module is further programmed to time shift the second deflection of the second suspension assembly when there is a longitudinal displacement between the second suspension assembly and the first suspension assembly, the time shift based upon at least a speed and a wheel base of the vehicle.

Example 11 includes the apparatus of example 8, wherein the mode of the vehicle is based on at least a speed and a steering angle of the vehicle and the first mode of the vehicle does not include a roll event and the second mode of the vehicle includes the roll event.

Example 12 includes the apparatus of example 11, wherein the suspension motion determiner module is further programmed to determine a first and second steering angle limit based upon a speed of the vehicle, compare a steering angle of the vehicle to the first and second steering angle limits, respectively, and determine whether the vehicle is utilized in the first mode or the second mode based on the steering angle of the vehicle satisfying the first steering angle limit or the second steering angle limit.

Example 13 includes the apparatus of example 12, wherein the suspension motion determiner module is further programmed to determine the vehicle is utilized in the first mode when the steering angle satisfies the first steering angle limit, determine the vehicle is utilized in the second mode when the steering angle satisfies the second steering angle limit, and determine the vehicle is utilized in a previously determined mode when the steering angle does not satisfy either of the first and second steering angle limits.

Example 14 includes the apparatus of example 8, wherein the suspension motion determiner module is further programmed to receive the second deflection, a third deflection, and a fourth deflection from the second, a third, and a fourth suspension assembly, respectively, determine the deflection of the first suspension assembly of the vehicle based on a first or a second calculation and the second, third, and fourth deflection of the second, third, and fourth suspension assemblies, respectively.

Example 15 includes a method comprising determining a mode of a vehicle, calculating deflection of a first suspension assembly based on a deflection of a second suspension assembly, and in response to determining the vehicle is utilized in a first or a second mode, a first or a second calculation, respectively, and outputting a signal to control the first suspension assembly based upon the calculated deflection.

Example 16 includes the method of example 15, further including filtering the deflection of the second suspension assembly with a low pass filter to determine a position of a body of the vehicle at a location approximate the second suspension assembly, and filtering the deflection of the second suspension assembly with a high pass filter to determine a position of a wheel of the vehicle, the wheel coupled to the second suspension assembly.

Example 17 includes the method of example 15, further including time shifting the deflection of the second suspension assembly when there is a longitudinal displacement between the second suspension assembly and the first suspension assembly, the time shift based upon at least a speed and a wheel base of the vehicle.

Example 18 includes the method of example 15, wherein the mode of the vehicle is based on at least a speed and a steering angle of the vehicle and the first mode of the vehicle does not include a roll event and the second mode of the vehicle includes the roll event.

Example 19 includes the method of example 18, further including determining a first and second steering angle limit based upon the speed of the vehicle, comparing the steering angle of the vehicle to the first and second steering angle limits, respectively, and determining whether the vehicle is utilized in the first mode or the second mode based on the steering angle of the vehicle satisfying the first steering angle limit or the second steering angle limit.

Example 20 includes the method of example 19, further including in response to the steering angle satisfying the first steering angle limit, determining the vehicle is utilized in the first mode, in response to the steering angle satisfying the second steering angle limit, determining the vehicle is utilized in the second mode, and in response to the steering angle satisfying neither of the first and second steering angle limits, determining the vehicle is utilized in a previously determined mode.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:
1. An apparatus comprising:
 a drive mode determiner to determine a mode of a vehicle;
 a calculation processor to calculate deflection of a first suspension assembly based on:
  a deflection of a second suspension assembly; and
  a first or a second calculation when the vehicle is utilized in a first mode or a second mode, respectively;
 a time shifter to time shift the deflection of the second suspension assembly when there is a longitudinal displacement between the second suspension assembly and the first suspension assembly, the time shift based upon at least a speed and a wheelbase of the vehicle; and
 a signal generator to output a signal to control the first suspension assembly based upon the calculated deflection.

2. The apparatus of claim 1, further including:
 a low pass filter to filter the deflection of the second suspension assembly to determine a position of a body of the vehicle at a location approximate the second suspension assembly; and
 a high pass filter to filter the deflection of the second suspension assembly to determine a position of a wheel of the vehicle, the wheel coupled to the second suspension assembly.

3. The apparatus of claim 1, wherein the mode of the vehicle is based on at least a speed and a steering angle of the vehicle and the first mode of the vehicle does not include a roll event and the second mode of the vehicle includes the roll event.

4. The apparatus of claim 3, wherein the drive mode determiner further includes:
 a first and second lookup table to determine a first and second steering angle limit based upon the speed of the vehicle;
 a first and second comparator to compare the steering angle of the vehicle to the first and second steering angle limits, respectively; and
 a mode determination engine to determine whether the vehicle is utilized in the first mode or the second mode based on the steering angle of the vehicle satisfying the first steering angle limit or the second steering angle limit.

5. The apparatus of claim 4, wherein the mode determination engine is further to:
determine the vehicle is utilized in the first mode when the steering angle satisfies the first steering angle limit;
determine the vehicle is utilized in the second mode when the steering angle satisfies the second steering angle limit; and
determine the vehicle is utilized in a previously determined mode when the steering angle does not satisfy either of the first and second steering angle limits.

6. The apparatus of claim 1, further including:
a data interface to receive deflection of the second, a third, and a fourth suspension assembly of the vehicle; and
the calculation processor determines the deflection of the first suspension assembly based on the first or second calculation and the deflection of the second, third, and fourth suspension assemblies.

7. An apparatus comprising:
a suspension motion determiner module programmed to:
output a signal to a first suspension assembly of a vehicle based on a first deflection of the first suspension assembly, the first deflection calculated based on a calculation and a second deflection of a second suspension assembly of the vehicle, the calculation selected based on whether the vehicle is utilized in a first mode or a second mode; and
time shift the second deflection of the second suspension assembly when there is a longitudinal displacement between the second suspension assembly and the first suspension assembly, the time shift based upon at least a speed and a wheelbase of the vehicle.

8. The apparatus of claim 7, wherein the suspension motion determiner module is further programmed to:
filter the second deflection of the second suspension assembly with a low pass filter to determine a position of a body of the vehicle at a location approximate the second suspension assembly; and
filter the second deflection of the second suspension assembly with a high pass filter to determine a position of a wheel of the vehicle, the wheel coupled to the second suspension assembly.

9. The apparatus of claim 7, wherein the mode of the vehicle is based on at least a speed and a steering angle of the vehicle and the first mode of the vehicle does not include a roll event and the second mode of the vehicle includes the roll event.

10. The apparatus of claim 9, wherein the suspension motion determiner module is further programmed to:
determine a first and second steering angle limit based upon a speed of the vehicle;
compare a steering angle of the vehicle to the first and second steering angle limits, respectively; and
determine whether the vehicle is utilized in the first mode or the second mode based on the steering angle of the vehicle satisfying the first steering angle limit or the second steering angle limit.

11. The apparatus of claim 10, wherein the suspension motion determiner module is further programmed to:
determine the vehicle is utilized in the first mode when the steering angle satisfies the first steering angle limit;
determine the vehicle is utilized in the second mode when the steering angle satisfies the second steering angle limit; and
determine the vehicle is utilized in a previously determined mode when the steering angle does not satisfy either of the first and second steering angle limits.

12. The apparatus of claim 7, wherein the suspension motion determiner module is further programmed to:
receive the second deflection, a third deflection, and a fourth deflection from the second, a third, and a fourth suspension assembly, respectively; and
determine the deflection of the first suspension assembly of the vehicle based on a first or a second calculation and the second, third, and fourth deflection of the second, third, and fourth suspension assemblies, respectively.

13. A method comprising:
determining a mode of a vehicle;
calculating deflection of a first suspension assembly based on:
a deflection of a second suspension assembly; and
in response to determining the vehicle is utilized in a first or a second mode, a first or a second calculation, respectively;
time shifting the deflection of the second suspension assembly when there is a longitudinal displacement between the second suspension assembly and the first suspension assembly, the time shift based upon at least a speed and a wheelbase of the vehicle; and
outputting a signal to control the first suspension assembly based upon the calculated deflection.

14. The method of claim 13, further including:
filtering the deflection of the second suspension assembly with a low pass filter to determine a position of a body of the vehicle at a location approximate the second suspension assembly; and
filtering the deflection of the second suspension assembly with a high pass filter to determine a position of a wheel of the vehicle, the wheel coupled to the second suspension assembly.

15. The method of claim 13, wherein the mode of the vehicle is based on at least a speed and a steering angle of the vehicle and the first mode of the vehicle does not include a roll event and the second mode of the vehicle includes the roll event.

16. The method of claim 15, further including:
determining a first and second steering angle limit based upon the speed of the vehicle;
comparing the steering angle of the vehicle to the first and second steering angle limits, respectively; and
determining whether the vehicle is utilized in the first mode or the second mode based on the steering angle of the vehicle satisfying the first steering angle limit or the second steering angle limit.

17. The method of claim 16, further including:
in response to the steering angle satisfying the first steering angle limit, determining the vehicle is utilized in the first mode;
in response to the steering angle satisfying the second steering angle limit, determining the vehicle is utilized in the second mode; and
in response to the steering angle satisfying neither of the first and second steering angle limits, determining the vehicle is utilized in a previously determined mode.

* * * * *